(12) United States Patent
Munn

(10) Patent No.: US 6,177,935 B1
(45) Date of Patent: Jan. 23, 2001

(54) COMPUTER OBJECT MANAGING CONTAINER AND MANAGING METHOD THEREOF

(75) Inventor: Kyong-Sok Munn, Seoul (KR)

(73) Assignee: Samsung Electronics Co., Ltd., Suwon (KR)

( * ) Notice: Under 35 U.S.C. 154(b), the term of this patent shall be extended for 0 days.

(21) Appl. No.: 09/040,152

(22) Filed: Mar. 18, 1998

(30) Foreign Application Priority Data

Mar. 26, 1997 (KR) .................................................. 97/10420

(51) Int. Cl.$^7$ ........................................................ G06F 3/00
(52) U.S. Cl. ........................ 345/335; 345/339; 345/348
(58) Field of Search ................................... 345/326, 335, 345/343, 344, 345, 346, 348, 339, 350; 707/500, 501, 514, 515, 516, 523, 530, 531

(56) References Cited

U.S. PATENT DOCUMENTS

| | | | |
|---|---|---|---|
| 4,815,029 | * 3/1989 | Barker et al. | 364/900 |
| 4,933,880 | * 6/1990 | Borgendale et al. | 364/523 |
| 5,438,662 | 8/1995 | Randall . | |
| 5,537,526 | 7/1996 | Anderson et al. . | |
| 5,555,370 | * 9/1996 | Li et al. | 395/161 |
| 5,579,521 | 11/1996 | Shearer et al. . | |
| 5,598,524 | 1/1997 | Johnston et al. . | |
| 5,638,505 | 6/1997 | Hemenway et al. . | |
| 5,642,490 | 6/1997 | Morgan et al. . | |
| 5,659,791 | * 8/1997 | Nakajima et al. | 395/802 |
| 5,664,208 | * 9/1997 | Pavley et al. | 397/777 |
| 5,682,468 | * 10/1997 | Fortenbery et al. | 395/119 |
| 5,692,184 | * 11/1997 | Ardoin et al. | 395/614 |
| 5,761,684 | * 6/1998 | Gibson | 707/515 |
| 5,895,477 | * 4/1999 | Orr et al. | 707/517 |

OTHER PUBLICATIONS

Anonymous disclosure, Enhancing single level clipboard to provide multiple layers graphically, Research Disclosure, #34756, Mar. 1993.*

Gaines, Brian R., et al, "Open Architecture Multimedia Documents", Proceedings of the Conference on Multimedia, pp. 137–146, Aug. 1993.*

Kirsch, Raymond P., "Teaching OLE Automation: A Problem-based Learning Approach", Proceedings of the Twenty-seventh SIGCSE Technical Symposium on Computer Science Education, pp. 68–72, Feb. 1996.*

Ladd, Scott Robert, C++ Templates and Tools, second edition, M&T Books, pp. 63–65, Dec. 1996.*

McFedries, Paul, Windows 95 Unleashed, Premier Edition, Sams Publishing, pp. 580–604, Dec. 1996.*

* cited by examiner

Primary Examiner—Joseph H. Feild
(74) Attorney, Agent, or Firm—Robert E. Bushnell, Esq.

(57) ABSTRACT

An object data managing system allows users to effectively manage object data when making a document by establishing an icon or categorizing a plurality of objects without any modifications or additions to an existing interface, thereby enabling the object data to be copied or moved without being damaged.

6 Claims, 13 Drawing Sheets

COMPUTER OBJECT MANAGING CONTAINER AND MANAGING METHOD THEREOF

This application makes reference to, incorporates the same herein, and claims all benefits accruing under 35 U.S.C. §119 from an application for OBJECT MANAGING CONTAINER AND MANAGING METHOD THEREOF earlier filed in the Korean Industrial Property Office on the 26th of March 1997 and there duly assigned Ser. No. 10420/1997.

BACKGROUND OF THE INVENTION

1. Field of the Invention

The present invention relates to an object managing container and managing method thereof for making a document by a word processor in an object oriented computing environment of a computer, and more particularly to an object managing container and managing method thereof which manages objects such as Object Linking and Embedding (OLE) data or 'Hun-Min-Jeong-Eum' (H-M-J-E) data for supporting an OLE interface.

To be even more specific, the present invention relates to an object managing container and an object managing method which improves the efficiency of making a document through a word processor by allowing a user to visually manage moving, collecting, and arranging object data by means of using a general clipboard and a drag-and-drop capability in an object oriented computing environment.

2. Description of the Related Art

First of all, the word processor which will be cited as one embodiment is 'Hun-Min-Jeong-Eum' (H-M-J-E) developed by Samsung Electronics Co., Ltd.

The field of an object oriented computing environment has vastly been broadened due to the improving computer technology such that it is possible to easily move an object generated from one application to another, and another application can easily use the object.

Generally, there are two methods for copying or moving an object from one file to another file.

The first method is to use a clipboard to move object data. The first step is to select an object data to be copied optionally. A copy command 'copy' or a cut command 'cut' from an edit menu is used to execute such process, or 'Ctrl+C' or 'Ctrl+X' can also be used. The second step is to open a new application to which the copied data should be moved. The final step is to paste the copied data to the new application by selecting a paste or append command from the edit menu, or 'Ctrl+V' can also be used.

The second method of moving the object data is by a 'drag and drop' function using OLE. The first step is to select an object data to be moved by a mouse, then move the selected data with the mouse button pressed. The second step is to move a mouse pointer to an application in which the selected object data is received. The final step is to release the mouse button when the mouse pointer is fixed at a window to which the selected object data should be moved.

For reference, the aforementioned OLE is a dynamic linking library (DLL), which is a part of Windows managing system for connecting objects from one application to another and controlling objects.

There are some problems associated with using the two methods mentioned above for managing the object data when moving the data. First, object data alone cannot be stored in a storing apparatus. In other words, a bit map or a document can only be saved in a format defined by each application. As a result, even through the object may look the same, the real format may be different. Second, the object data can only be saved by being included in a document.

The following describes the two problems mentioned above in terms of moving objects.

First of all, users cannot see what type of object is stored in a clipboard (i.e. for copying and pasting). As a result, since the users cannot verify the copied object, when a certain object is being used frequently, the user may keep copying the same object. Secondly, in the case of operating the object data by using the drag and drop function or the clipboard, a single form of object data is possible. In other words, only one object data can be stored in the clipboard. Therefore, it becomes very inefficient to form a document using many objects.

The following describes the two problems of methods for moving object data mentioned earlier in terms of managing object data.

The document, which includes the object, only has a function related to the document and does not have a function for managing the object data. Moreover, as a number of objects to be managed increases, the user who is using the document as an object managing container, may find it very difficult to manage such large number of object data.

The patent to Anderson et al., U.S. Pat. No. 5,537,526, entitled Method And Apparatus For Processing A Display Document Utilizing A System Level Document Framework, discloses document processing with objects by creating a container object to hold a plurality of objects.

The patent to Nakajima, U.S. Pat. No. 5,659,791, entitled Encapsulation Of Extracted Portions Of Documents Into Objects, discloses encapsulation of scrap portions of documents into objects utilizing a clipboard, icons and drag and drop.

The patent to Morgan et al., U.S. Pat. No. 5,642,490, entitled Providing Icon Placement Alternatives For Dynamically Added Container Records, discloses a container of multiple icons grouped together in a page representing objects of stored word processing data.

The patents to Hemenway et al., Johnston Jr. et al., and Shearer et al., U.S. Pat. Nos. 5,638,505, 5,598,524, and 5,579,521, respectively entitled Apparatus And Methods For Moving/Copying Objects Using Destination And/Or Source Bins, Method And Apparatus For Improved Manipulation Of Data Between An Application Program And The Files System On A Computer-Controlled Display System, and Conversion Of Data And Objects Across Classes In An Object Management System, each disclose data manipulation with objects and icons.

The patent to Randall, U.S. Pat. No. 5,438,662, entitled Electronic Display And Data Processing Apparatus For Displaying Text And Graphics In A Ring Binder Representation, discloses a text and graphics display using a ring binder.

SUMMARY OF THE INVENTION

It is therefore an object of the present invention to provide an object data managing system which allows users to effectively manage object data when making a document by establishing an icon or categorizing a plurality of objects without any modifications or additions to an existing interface.

Another object of the present invention is to provide a method of copying and moving of object data without damaging the data.

According to one aspect of the present invention, an object managing container includes: a unit for storing a specific data and managing a specific data object upon the specific data object having specific data being inputted to the object managing container; a unit for displaying the specific data as an icon; a unit for categorizing the specific data object based on its characteristics; and a unit for encapsulating the specific data object as a first object by adding the stored specific data to the specific data object for moving the specific data object from the object managing container.

Preferably, the object managing container includes: a unit for displaying a general data object as an icon, upon an object having general data being inputted; a unit for categorizing the general data object; and a unit for encapsulating the general data object as a second object for moving the general data object from the object managing container.

Preferably, the unit for storing and managing includes a unit for determining whether the specific data object is inputted to the object managing container; a unit for determining whether it is possible for the specific data to be copied and moved; a unit for storing the specific data; and a unit for managing the specific data.

The specific data preferably includes H-M-J-E data, and the general data includes object data formed from object oriented computing environment. Furthermore, first and second objects each include an OLE object, and the object managing container includes a plurality of scrap books divided into a plurality of categories for separating at least one of the first and second objects according to the characteristics.

According to another aspect of the present invention, an object managing method includes the steps of: storing a specific data and managing a specific data object upon the specific data object having the specific data being inputted to an object managing container; displaying the specific data object as an icon; categorizing the specific data object based on its characteristics; and encapsulating the specific data object as a first object by adding the specific data stored in the specific data object for moving the specific data object from the object managing container.

Preferably, the object managing method further includes the steps of: displaying a general data object as an icon, upon general data being inputted; categorizing the general data object; and encapsulating the general data object as a second object for moving the general data object from the container.

According to another aspect of the present invention, an object managing device, includes: a unit for receiving at least one object and visually displaying the received at least one object; a unit for managing the at least one object; and a unit for hiding or displaying the at least one object being managed by the unit for managing, from/to the user.

According to another aspect of the present invention, the object managing method, includes the steps of: receiving at least one object and visually displaying the at least one received object; managing the at least one object; and hiding or displaying the at least one object being managed by the unit for managing, from/to the user according to the user's request.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The preferred embodiments hereinafter will be described in more specific detail by referring to the attached drawings. Devices disclosed in this preferred embodiment are named in consideration with their function.

Figure 1:
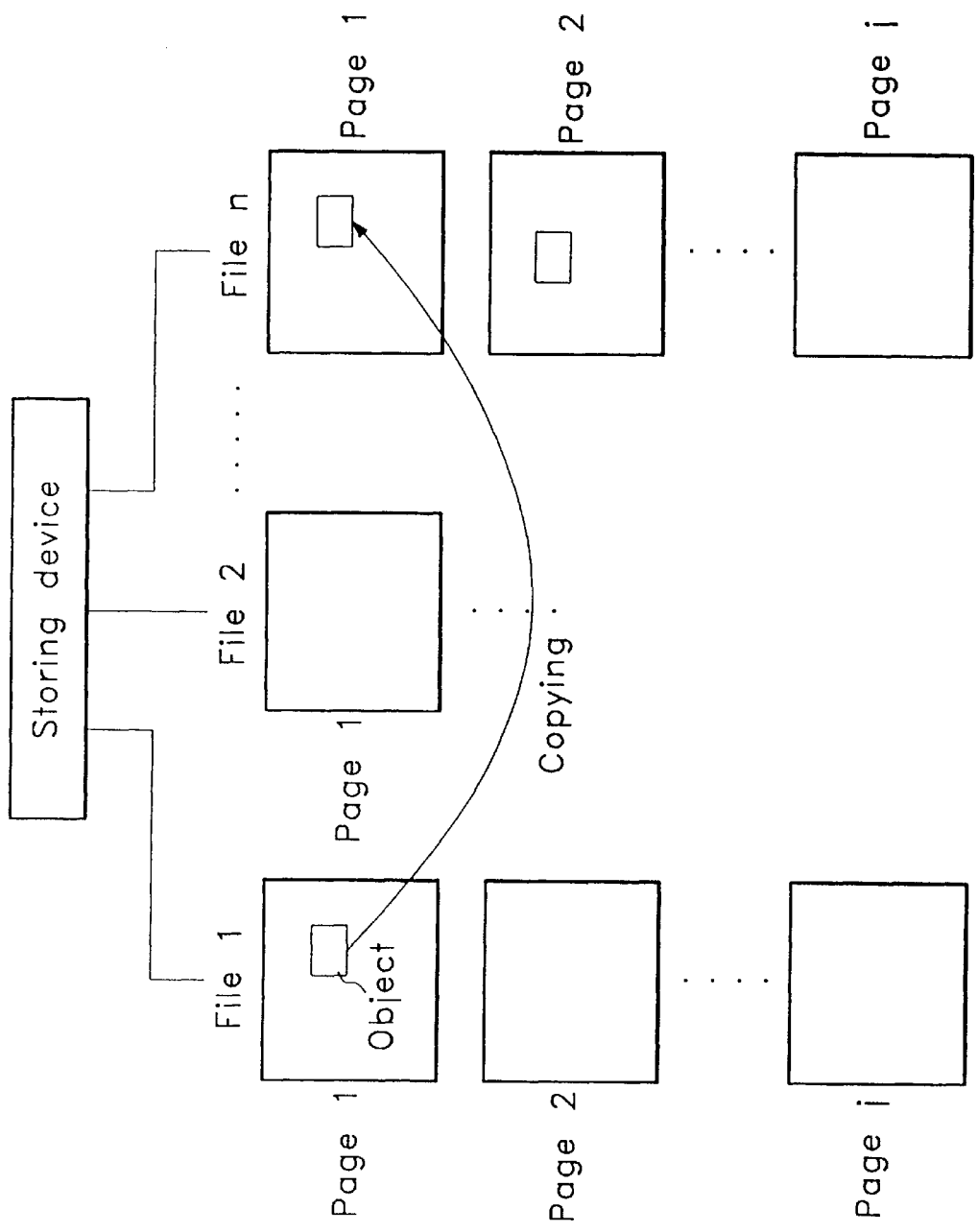
FIG. 1 is a block diagram of documents stored in a storing device.

FIG. 1 is a block diagram illustrating an earlier method of copying an object within a file stored in a memory of a computer to another file. In other words, FIG. 1 depicts copying and moving an object among a number of applications. In order to complete such tasks however, the related applications, such as document files, must be loaded into a main memory.

Figure 2A:
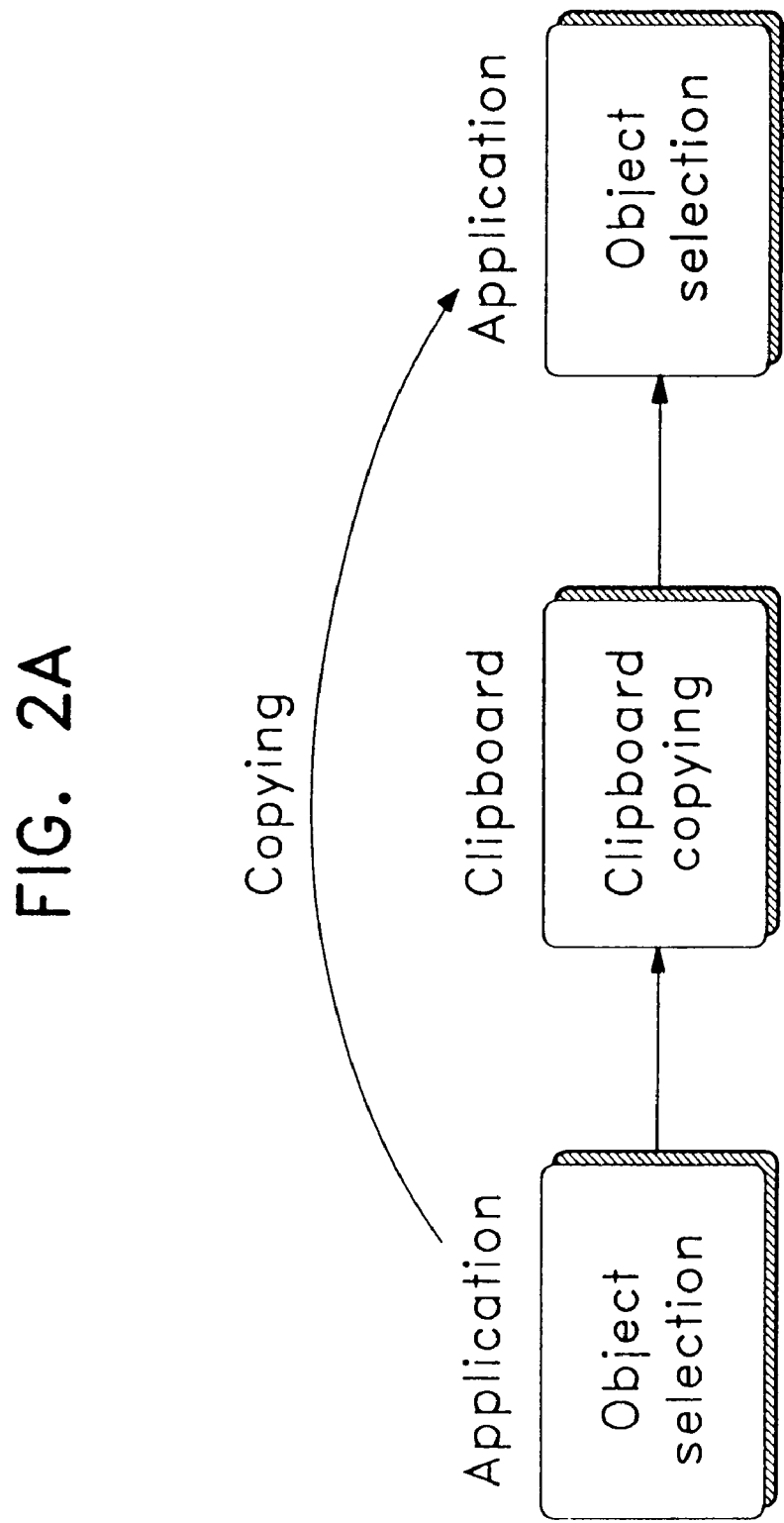
FIG. 2A is a diagram showing copying of an object using an earlier clipboard.
Figure 2B:
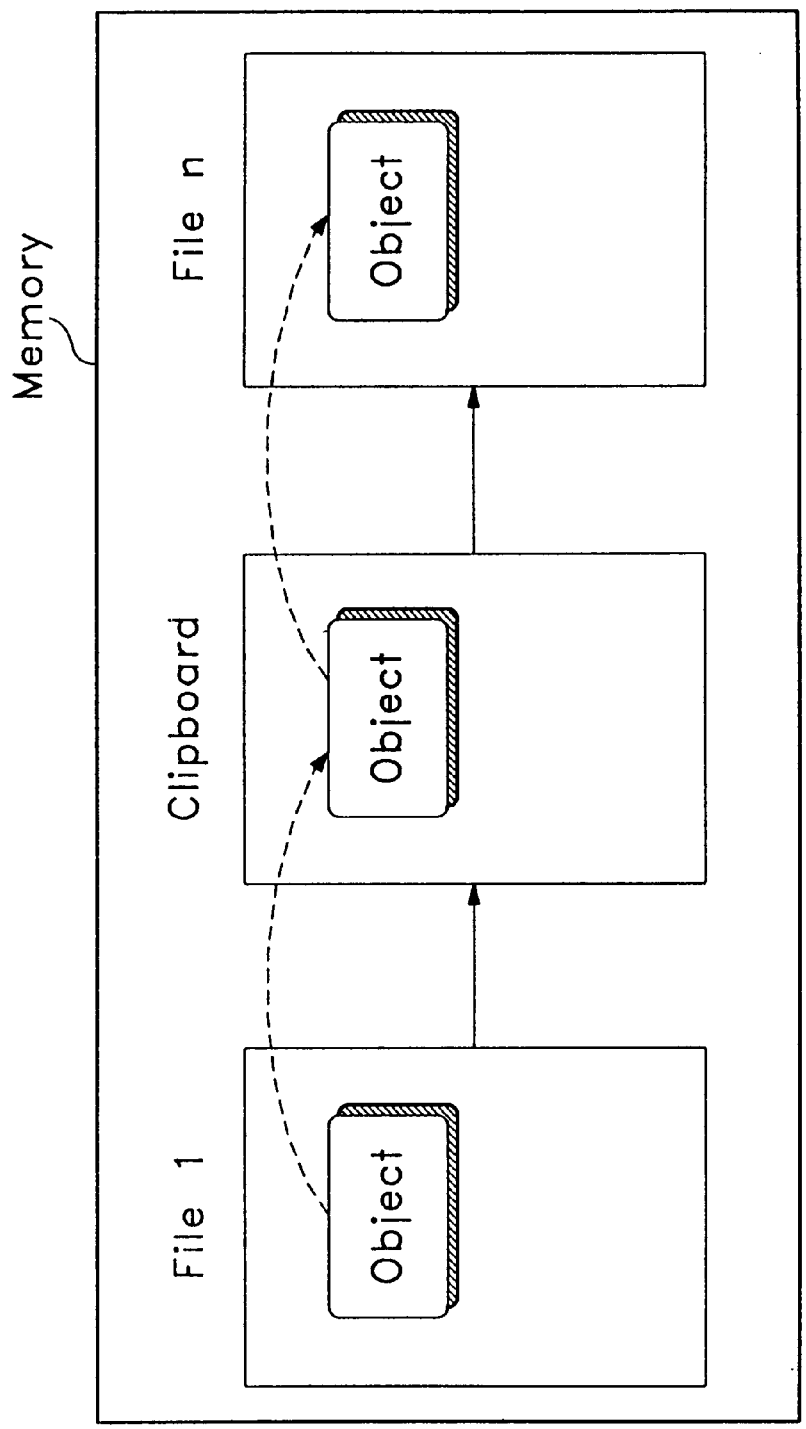
FIG. 2B is a diagram showing moving of an object using an earlier clipboard.

FIGS. 2A and 2B illustrate the first method of using a clipboard to move object data as discussed in detail above in the Description of the Related Art.

Figure 3A:
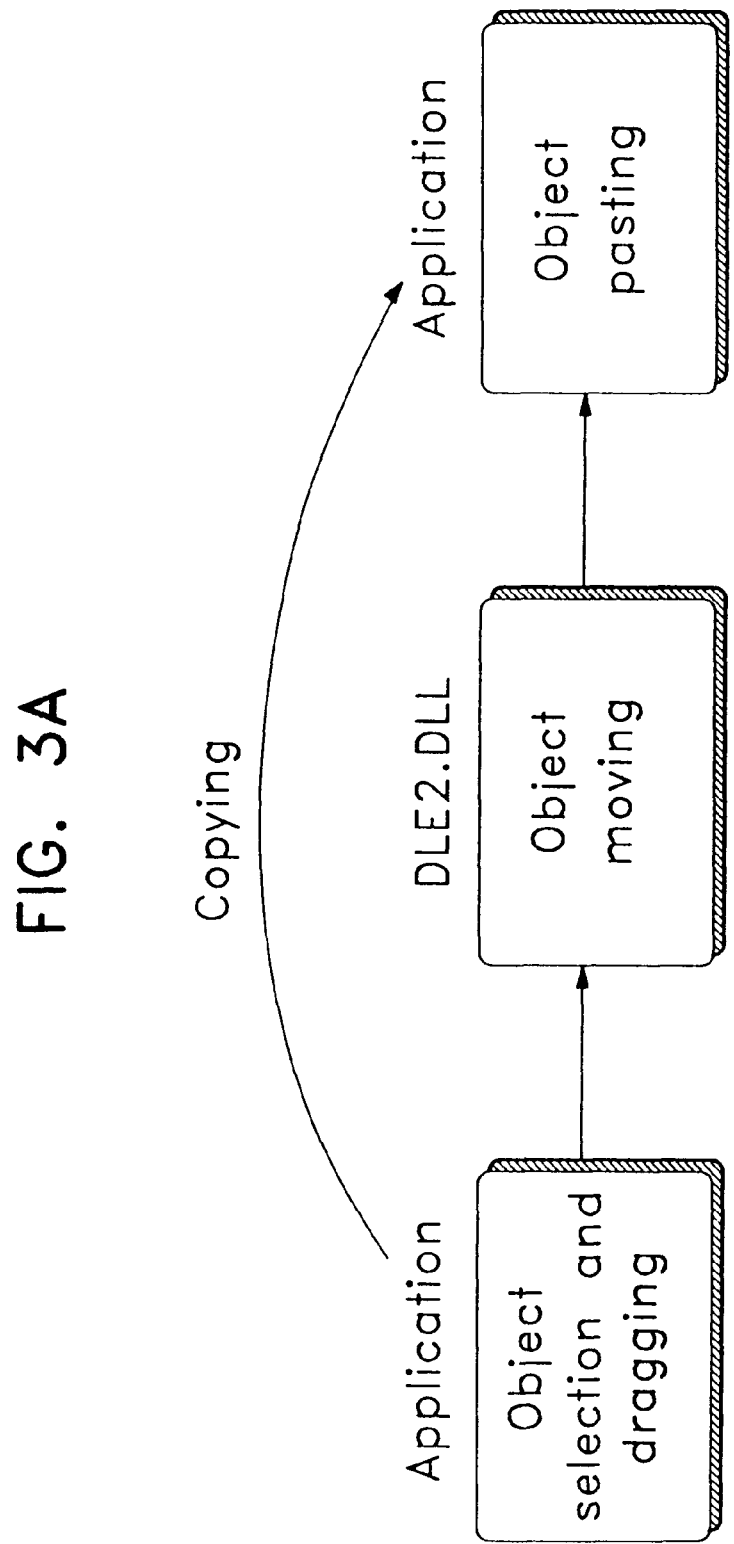
FIG. 3A is a diagram showing copying of an object using an earlier OLE.
Figure 3B:
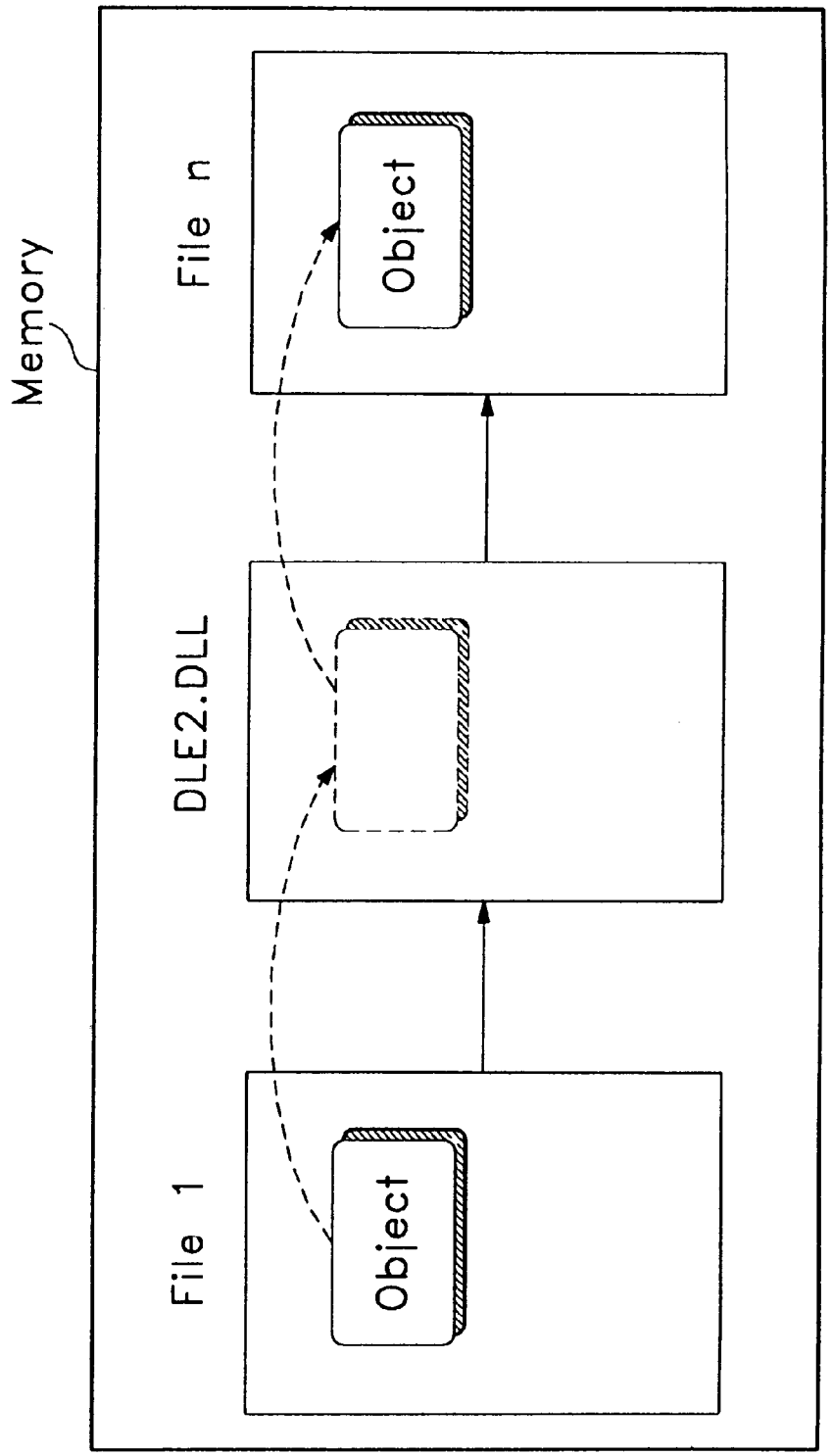
FIG. 3B is a diagram showing moving of an object using an earlier OLE.

FIGS. 3A and 3B illustrate the second method of moving the object data by a drag and drop function using OLE as discussed in detail above in the Description of the Related Art.

Figure 4:
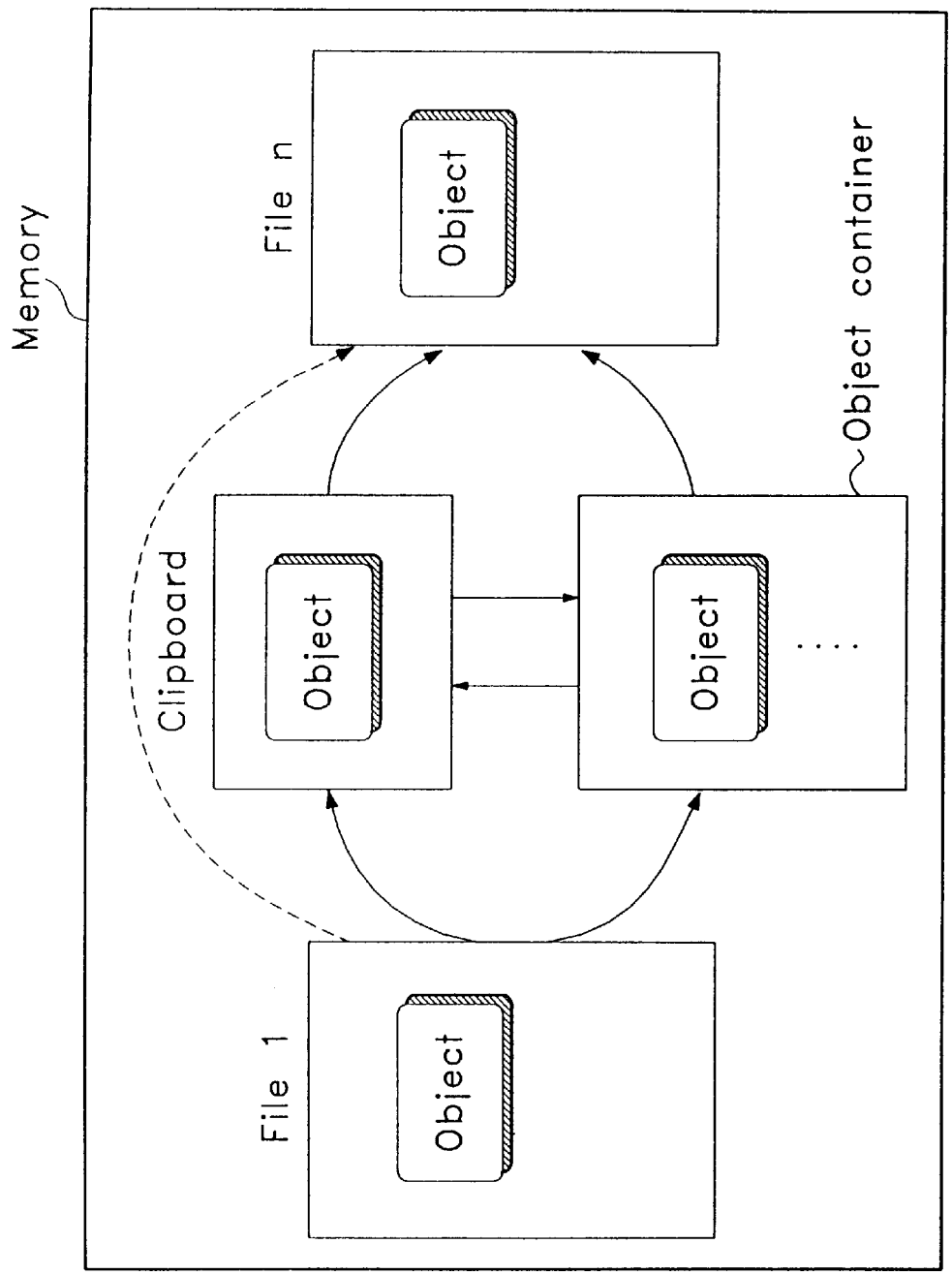
FIG. 4 is a diagram showing copying and moving of an object according to the present invention.

FIG. 4 is a diagram showing copying and moving of an object according to the present invention.

Referring to the drawing, an object managing container is provided for visually managing a number of objects while in the process of copying an object from an application (File 1) to another (File n).

Figure 5:
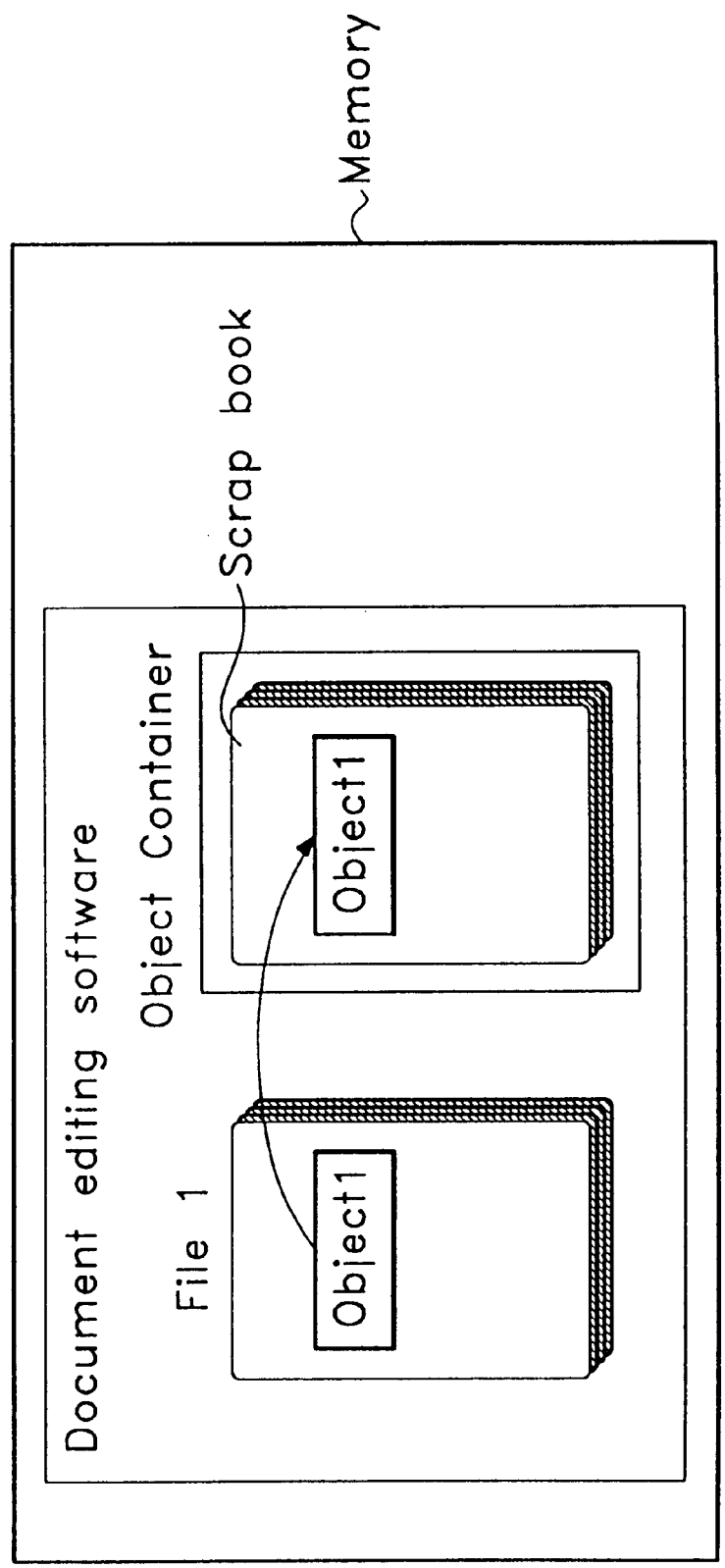
FIG. 5 is diagram showing object management using an object managing container according to the present invention.

The object managing container, as illustrated in FIG. 5, includes a number of scrap books for categorizing objects according to the kind of object, and each scrap book manages similar objects.

Figure 6:
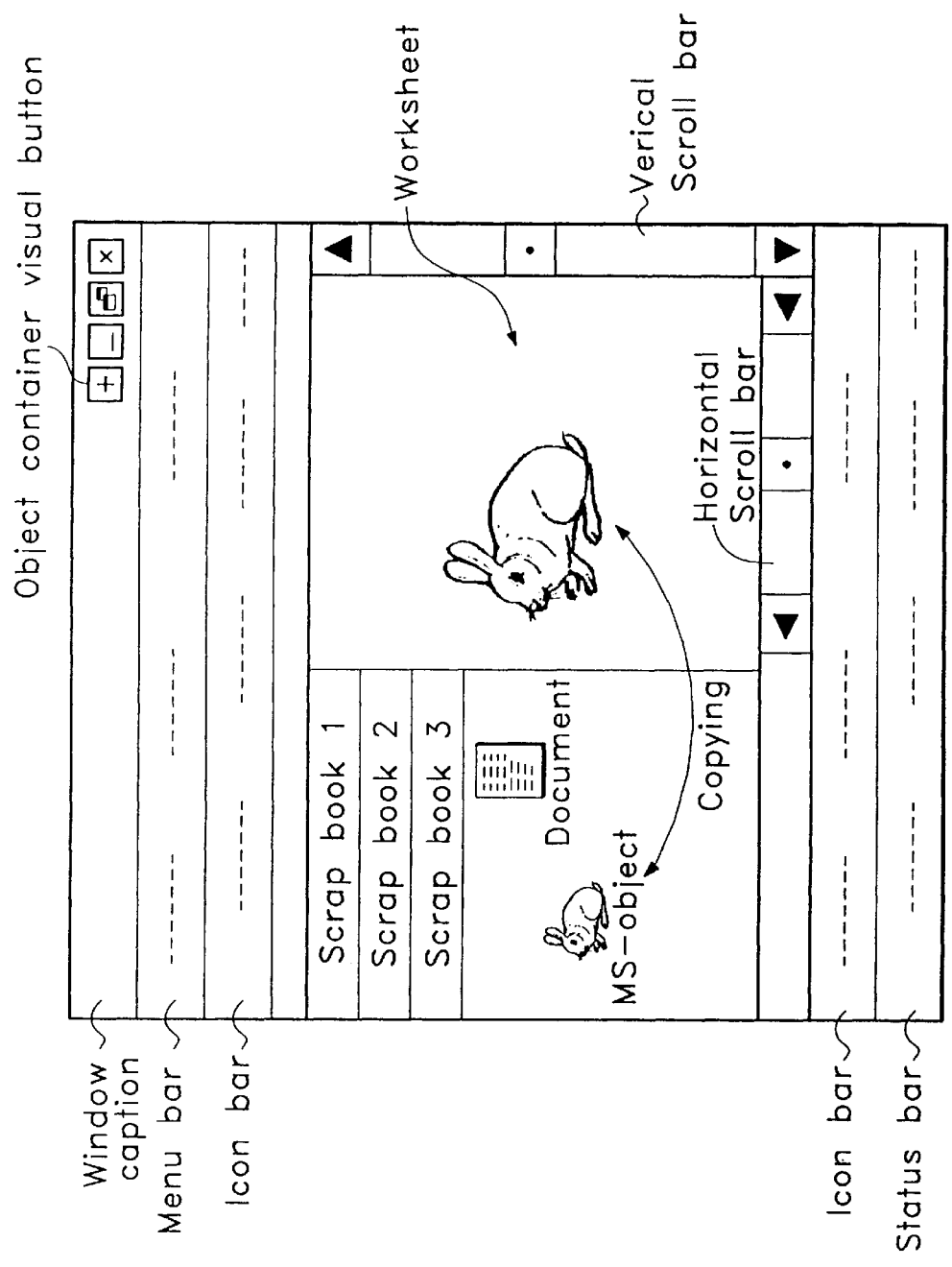
FIG. 6 a diagram showing an object managing container and a layout of a document edit window (worksheet) according to the present invention.

FIG. 6 is a diagram showing a graphic user interface (GUI) including the object managing container of FIGS. 4 and 5, a number of scrap books, and a document edit window of an application in use, labeled as worksheet in FIG. 6 of the present invention. As shown in the drawing, one of the objects visually stored in a number of scrap books can be selected using a mouse for moving to the document edit window of an application in use, labeled as worksheet in FIG. 6 by means of a drag and drop mechanism. The embodiment shown in FIG. 6 illustrates the process of inserting an animal picture object (Ms-object) completed by an application developed by Microsoft, into a document. At this time, the user can also select an object from the document edit window or another application to move the selected object to the object managing container, so that the object managing container may manage the selected object. Moreover, when the object data is stored and managed by the object managing container made of a number of scrap books, the stored data is assigned to an icon by using 'IViewObject'. In the embodiment illustrated in FIG. 6, users can hide or display the objects which are managed in the object managing container by using an object managing container visual button out of window control icons provided at a window caption.

Figure 7:
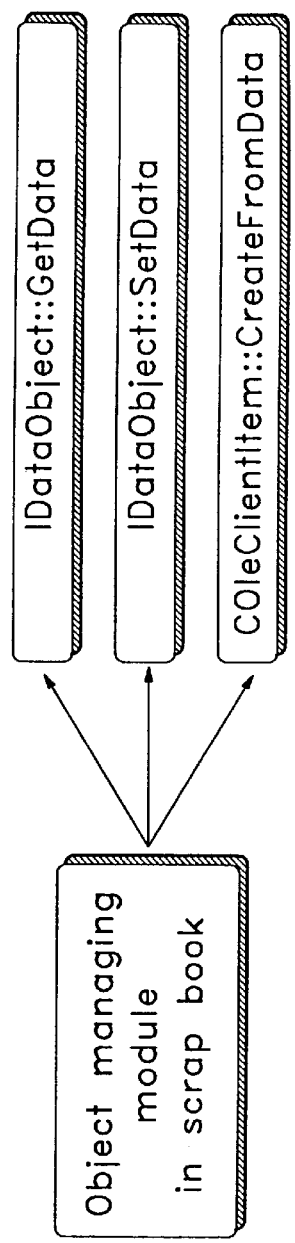
FIG. 7 is a block diagram showing a module for managing objects in a scrap book according to the present invention.

FIG. 7 is a block diagram showing a module for managing the object in the scrap book according to the present invention. To manage the H-M-J-E data and other OLE objects, an 'IDataObject' interface and a 'COleClientItem' object are used. As shown in the drawing, the 'IDataObject' interface has a 'GetData' method and a 'SetData' method, and the 'COleClientItem' object has a 'CreateFromData' method. That is, the module of FIG. 7 stores a moved object by changing the moved object into an icon form in the scrap book when the user moves into the scrap book an object existing in the worksheet by the copying method or drag and drop method, while the module provides the moved object to the worksheet when the user moves the icon into the worksheet by the copying method or the drag and drop mechanism.

To perform these operations, the preferred embodiment of the present invention uses the object oriented language and applies three methods which is similar to a function of non-object oriented language.

GetData method acquires the object data from the worksheet. CreatFromData method makes data received by IviewObject to be an icon. SetData method transfers the object data existing as an icon at the scrap book, into the worksheet.

These methods simply execute an operation principle of the module for amanaging the objects of the scrap book.

Figure 8:
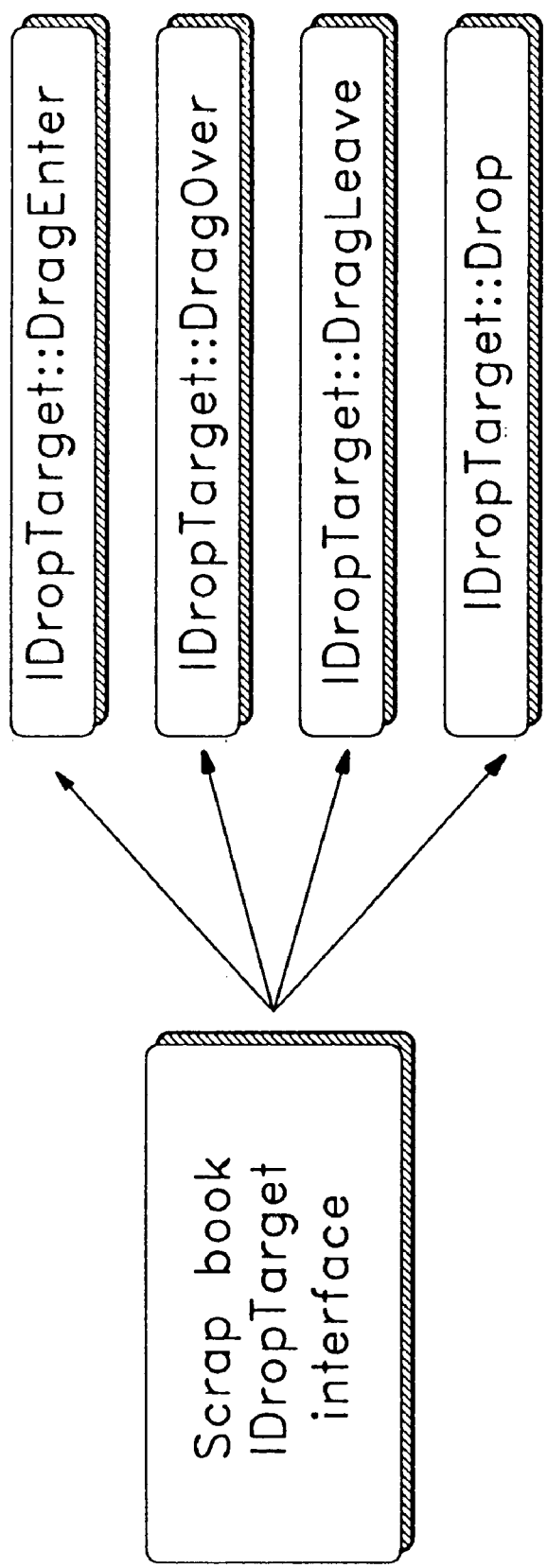
FIG. 8 is a block diagram showing a module for executing a drag and drop in a scrap book according to the present invention.

FIG. 8 is a block diagram showing a module for executing a drag and drop in the scrap book, which is called as a scrap book IDropTarget interface. To copy the data by the drag and drop method, an 'IDropTarget' interface is used. As shown in the drawing, the 'IDropTarget' interface has a 'DragEnter' method, a 'DragOver' method, a 'DragLeave' method and a 'Drop' method. The module of FIG. 8 is a control module for controlling the movement of an object selected by a user into the scrap book or the worksheet using a drag and drop mechanism. To accomplish this control, the preferred embodiment of the present invention uses the object-oriented language and applies for four methods.

Figure 9:
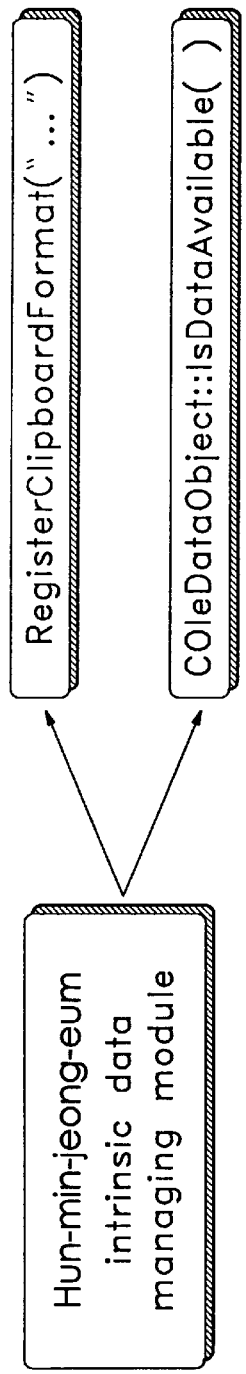
FIG. 9 is a block diagram showing a module for maintaining H-M-J-E intrinsic data in a scrap book according to the present invention.

FIG. 9 is a block diagram showing a module for managing and maintaining the H-M-J-E intrinsic data in the scrap book according to the present invention, which includes a 'RegisterClipboardFormat(" . . . ")' method and a 'COleDataObject' object. The 'COleDataObject' has an 'IsDataAvailable' method. The aforesaid objects and methods are operated to perform the function of the corresponding modules, and their roles are easily understood by their names and as explained above.

The object managing container includes a module for managing the object in the scrap book, a module for executing the drag and drop in the scrap book, and a module for managing and maintaining the H-M-J-E intrinsic data in the scrap book. The operation of the object managing container will be explained.

First, the object managing container can control the H-M-J-E data and all other OLE objects. The object managing container can copy object data which is in the clipboard supported by the operating system and copy the data by the drag and drop.

Moreover, the object managing container controls the storage of the H-M-J-E intrinsic data and the maintenance of the information made by the user. Since the data of the object managing container (object data) is stored in the objects data own format, the object data can be managed, regardless of the documents. At this time, the object managing container manages the object data by establishing the object data as an icon.

Figure 10A:
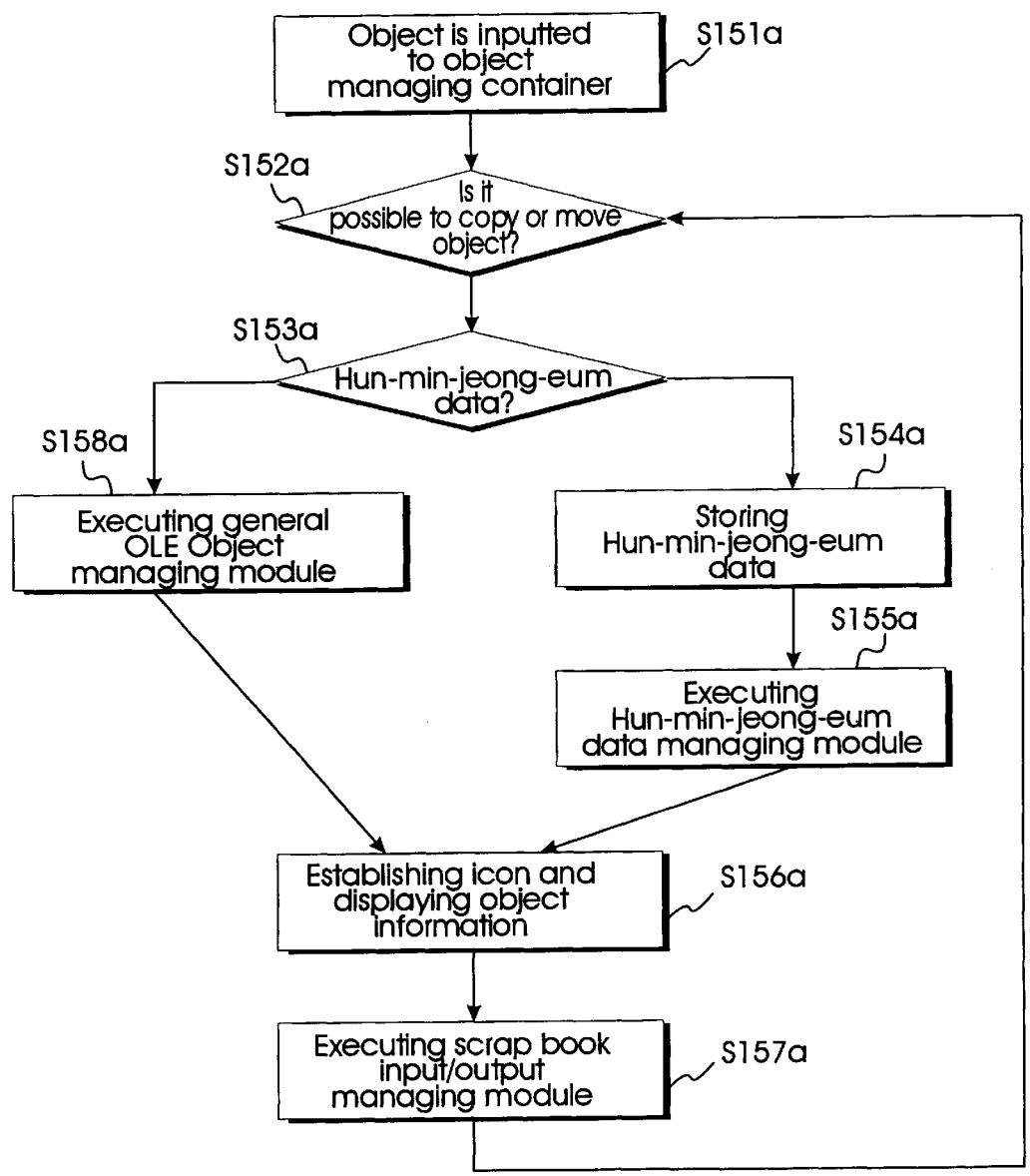
FIGS. 10A and 10B are flowcharts showing object managing methods of an object managing container according to the present invention.
Figure 10B:
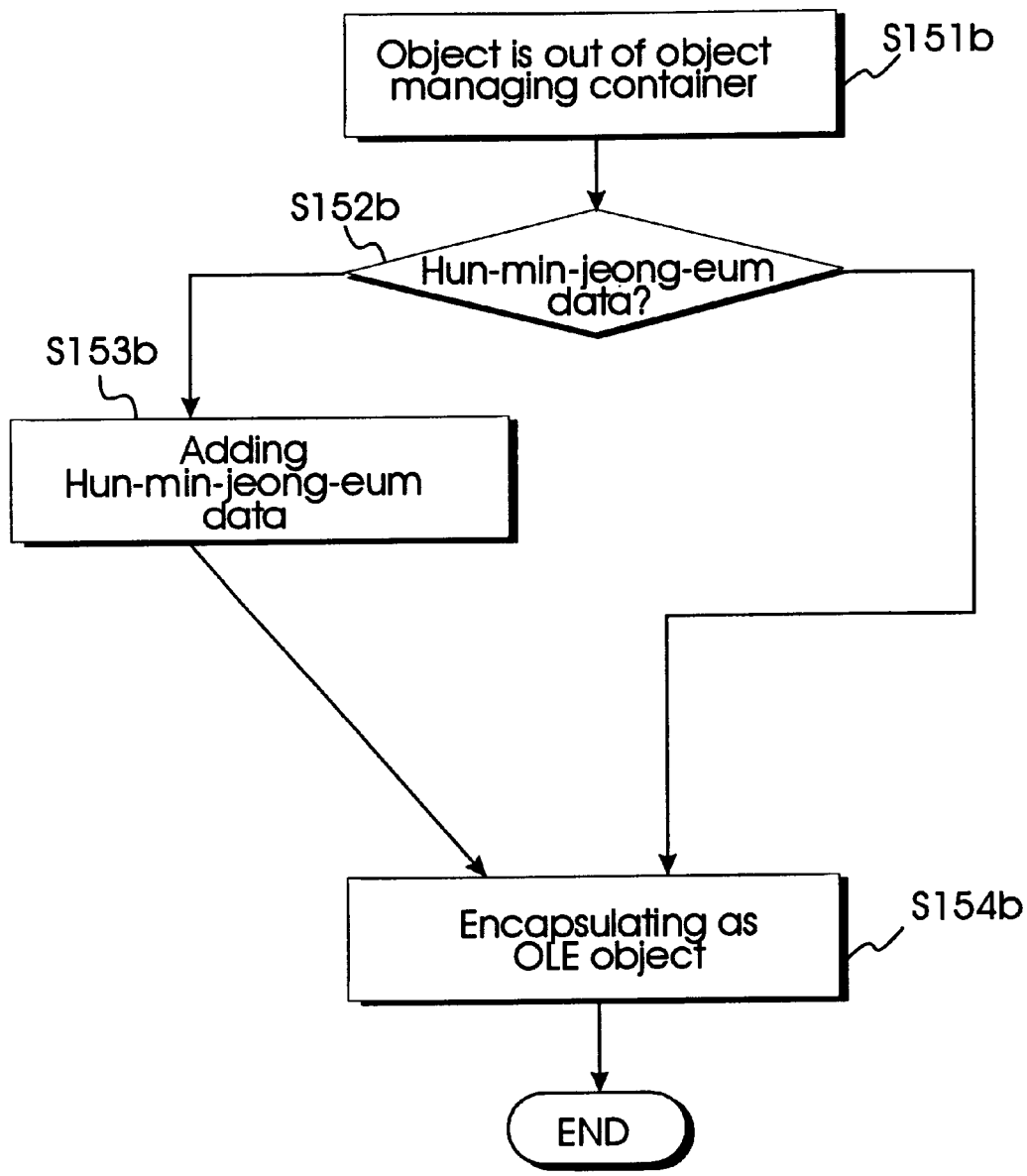

FIGS. 10A and 10B are flowcharts showing the object managing method of the object managing container according to an example of an embodiment of the present invention. FIG. 10A illustrates a control method when the object enters the object managing container, and FIG. 10B illustrates a control method when the object gets out of the object managing container. As shown in FIG. 10A, first, the object is entered to the object managing container (S151a). When it is possible to copy or move the object (S152a), it is determined whether the object data is H-M-J-E data (S153a). In the case that the object is the H-M-J-E data, the data is stored (S154a), and a first managing module for managing the H-M-J-E data is performed (that is, executed) (S155a). After that, the object containing the H-M-J-E data is established as an icon and the object information is displayed (S156a). Moreover, a second scrap book input/output managing module for managing the objects containing H-M-J-E data after the object data has been changed into object data of icon form. That is, the first managing module controls the object data before the object data is changed into the object data of icon form, while the second scrap book I/O managing module controls the object data after the object data has been changed into object data of icon form is performed (S157a). As a result of the determination of S153a, when the object data is not the H-M-J-E data, a general OLE object managing module for managing the object is performed (S158a). After that, the object is established as an icon and the object information is displayed (S156a). The scrap book input/output managing module for managing the object data is performed (S157a)

Referring to FIG. 10B, the control method when the object is out of the object managing container, that is, the series of procedures used when an object gets out of the object managing container, will be explained. As shown in the drawing, first, the object is taken out of the object managing container (S15b), and it is determined whether the object is H-M-J-E data (S152b). In the case that the object is H-M-J-E data, the H-M-J-E data is added to the object (S153b), and the object is encapsulated by the OLE object (S154b). On the contrary, in the case that the object is not H-M-J-E data, the object is directly encapsulated by the OLE object (S154b).

The process for controlling the object when the object is entered to the object managing container will be explained, referring to FIG. 7 to FIG. 10A. When an object is inputted to the object managing container from an application, it is determined whether it is possible to copy or move the object (S151a and S152a). As a result of the determination, in the case that it is not possible to copy or move the object, the object is not executed (Step 152c), that is, not processed by a process such as copying or moving. Assuming that it is possible to copy or move the object, it is determined whether the object data is H-M-J-E data (S153a).

When the object is H-M-J-E data, the data is stored and a managing module shown in FIG. 9 is performed to manage the H-M-J-E data (S154a and S155a). At this time, the 'RegisterClipboardFormat(" . . . ")' method is used. Afterwards, the object containing the H-M-J-E data is established as an icon and the object is displayed to the user (S156a). Here, the object data is established as an icon by using the 'ViewObject' supported by the general OLE data. After that, the scrap book input/output managing module is performed executed to manage after categorizing the objects containing the H-M-J-E data each according to its characteristic (S157a). That is, icon objects are classified depending on their properties and are then managed by the scrap book input/output managing module. In other words, the scrap book object managing module of FIG. 7 and the module for executing the drag and drop in the scrap book of FIG. 8 are used.

As a result of the determination of S153a, in the case that the object is general data instead of the H-M-J-E data, a general OLE object managing module for managing the general data is performed (executed) (S158a). After operating the general OLE object management module, the general object data is established as an icon and it is displayed to the user (S156a). After that, the scrap book input/output managing module for managing the general data according to the characteristics is performed (S157a). Here, characteristics refers to properties used for classifying the object data into specific groups, for example, the extended name of the file. At this time, to copy the object data into one scrap book of a plurality of scrap books included in the object managing container by using the drag and drop method, the 'DragEnter' method of the 'IDropTarget' interface, 'DragOver' method, 'DragLeave' method and the 'Drop' method are called.

Referring to FIG. 7 to FIG. 10B, the control process when the object is taken out of the object managing container is explained as follows. First, when the object is moved from the object managing container to another application, it is determined whether the object is H-M-J-E data (S151b and S152b). In the case that the object is H-M-J-E data, the H-M-J-E data which is stored in S154a of FIG. 10A is added to the object, and the object is encapsulated by the OLE object (S153b and S154b). Assuming that the object is a general data instead of the H-M-J-E data, the general data is encapsulated by the OLE object (S154b).

General data mentioned in the specification indicates all kinds of data excluding the H-M-J-E data. In other words, it indicates object data made in a different object oriented computing environment such as the objects made in applications developed by Microsoft.

Figure 11:
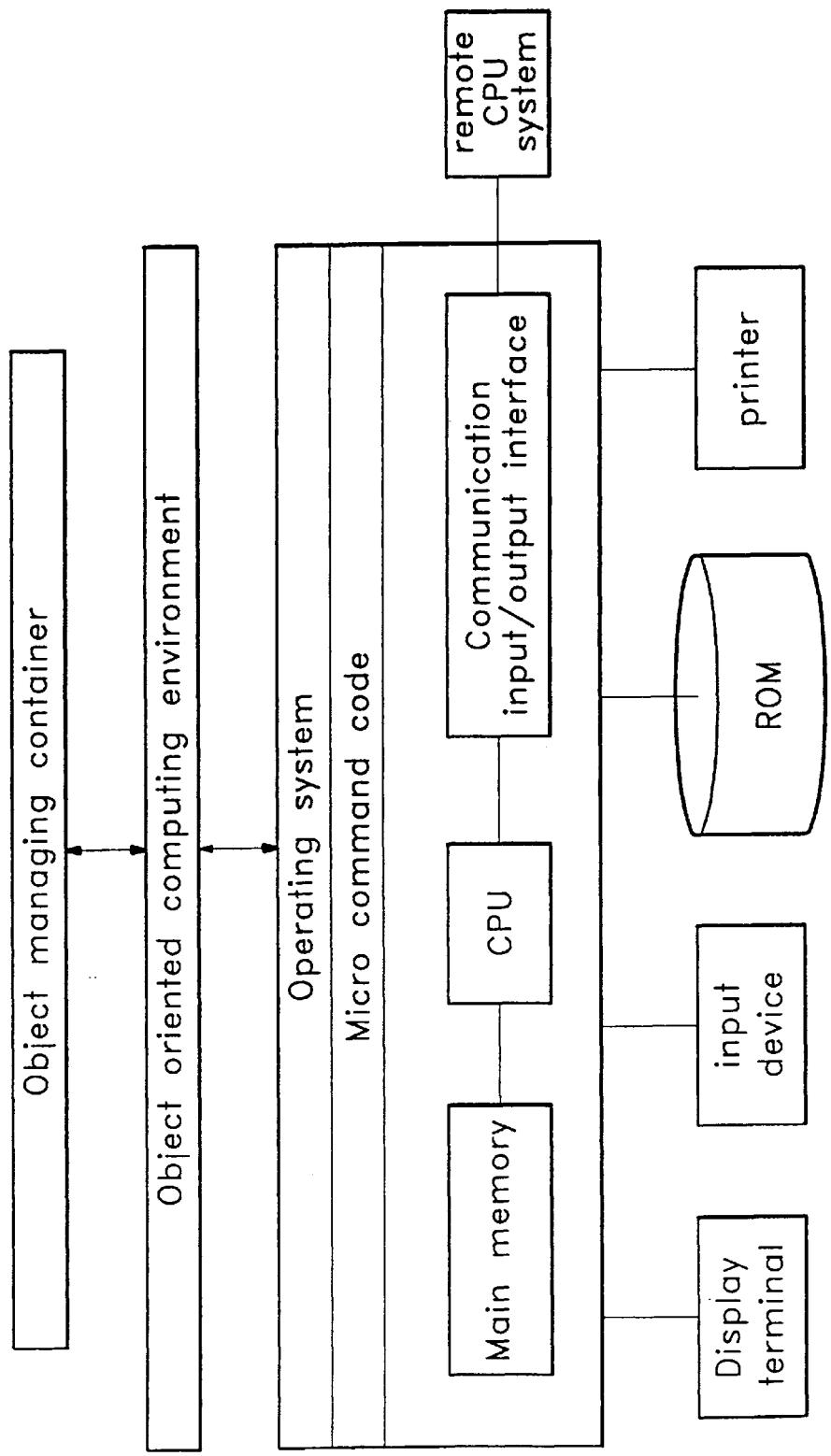
FIG. 11 is a block diagram of a computer system used for executing the present invention.

FIG. 11 illustrates an operating environment of a word processor using the object managing container according to the present invention. As mentioned above, the word processor as an embodiment is the H-M-J-E word processor.

The copying and moving of the object in the word processor applying the object managing container of the present invention will be explained, referring to FIG. 6, FIGS. 10A and 10B and FIG. 11. The moving of the object data is performed as follows. A specific scrap book which is suitable to the form of the object to be copied to the object managing container is selected out of a plurality of scrap books included in the object managing container. Or, a new container (scrap book) can be made. An object data on a document to be copied is selected. The selected object data is copied to the object managing container using the clipboard or the drag and drop function. After that, the copied object data is displayed as an icon form. At this time, the container having a plurality of scrap books can visually manage a plurality of objects, and users can easily use the objects when necessary.

When moving the object data using the object managing container of the present invention, the container can maintain an intrinsic format of the stored object data and manage the stored object data, irrespective of the documents.

As described above, as it is possible to move data between a document and a container using the existing clipboard and the drag and drop function, users can use the object managing container without any modifications or additions to the interface. Since a plurality of objects are managed together, the efficiency in forming the document is enhanced and the objects can be categorized. Moreover, as each object is established as an icon and users can easily note the kinds of the objects, it is possible to manage the object data efficiently.

Additionally, when the object data enters into the object container, it is determined whether or not the object data is a specific data such as H-M-J-E data. When the object data is the specific data, the object data is stored without any loss of the data, and can afterwards be copied in an application needing the specific data forming the predetermined form of data, without any loss of information.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for managing an object-oriented programming object, comprising the steps of:

when an object is to be managed and when it is determined that it is, possible to copy or move said object, then determining if said object is of the format of a particular program;

when said object is determined to be not of the format of said particular program, then executing a general object-linked embedding object managing module; and when said object is determined to be of the format of said particular program, then storing the data of the object, then registering the clipboard format of said data of said object and determining if the data are available;

then, displaying, in a scrap book, an icon and object information corresponding to said object; and executing a scrapbook managing module comprising the steps of:
  displaying the dragging and dropping of an icon corresponding to said object into the scrap book; and
  executing the steps of getting data, setting data and creating from data.

2. The method of claim 1, further comprising the steps of:
determining if the stored data of said object are of the format of said particular program;
when said data are determined to be of the format of said particular program, then adding the stored data to said object; and
encapsulating said object as an object-linked embedding object.

3. The method of claim 1, said particular program being Hun-min-jeong-eum.

4. The method of claim 2, said particular program being Hun-min-jeong-eum.

5. The method of claim 1, further comprising the steps of:
displaying said icon corresponding to said object in a window comprising:
  a window caption having an object container visual button;
  a worksheet;
  a scrap book menu tab; and
  a scrap book in which said icon is displayed.

6. The method of claim 5, said window further comprising:
a plurality of scrap book menu tabs, for selecting the display of additional scrap books.

* * * * *